INVENTOR
FREDERICK ASHWORTH WOODHEAD
by Norris & Bateman
ATTORNEYS

United States Patent Office 3,428,117
Patented Feb. 18, 1969

3,428,117
APPARATUS FOR COOLING HOT WASTE GASES
Frederick A. Woodhead, Bramhall, England, assignor to Simon-Carves Limited, Stockport, England, a British company
Filed Dec. 12, 1966, Ser. No. 601,050
Claims priority, application Great Britain, Dec. 22, 1965, 54,378/65
U.S. Cl. 165—105     2 Claims
Int. Cl. F28d 15/00

ABSTRACT OF THE DISCLOSURE

Apparatus for cooling hot waste gases from steel-making equipment comprising a first heat exchanger positioned above an efflux of hot gas from steel-making equipment, the heat exchanger being cooled by aqueous fluid which after cooling of the gas is passed to a second heat exchanger in which the fluid is cooled before being recycled to the first heat exchanger. The waste gases after being cooled are emitted from the apparatus without recovery of waste heat.

---

This invention is concerned with improvements in or relating to cooling waste gases.

In, for example, one process for the conversion of pig iron to steel certain elements including carbon, phosphorus, silicon and manganese are oxidised by blowing oxygen through the material in a converter, the oxidation products being released as slag or waste gases. The hot waste gases contain carbon monoxide and suspended dust which includes iron oxide, calcium oxide and slag; the concentration of suspended dust is reduced by passing the gases through an electro-precipitator. In order to obtain economic electro-precipitation it is necessary first to cool the gases.

It is an object of the invention to provide an improved apparatus adapted for use in cooling hot waste gases from steel making plant.

It is another object of the invention to provide an improved method of cooling hot waste gases from steel making plant.

Aqueous fluid is used as a cooling medium. By the generic term aqueous fluid when used herein we include water, steam and mixtures thereof.

According to the present invention there is provided apparatus for cooling hot waste gases, usually from steel-making equipment, comprising first heat exchange means for exchanging heat between hot gases and a cooler, preferably aqueous fluid, said first means comprising a vertical passage defining means such as a shell of circular cross-section and a plurality of tubes or like conduits mounted in the shell around an inner peripheral wall thereof, second heat exchange means for exchanging heat between said aqueous fluid and an air stream and for rejecting said air stream to atmosphere, said second heat exchange means preferably comprising a second shell having an open lower and an open upper end, a plurality of horizontal tubes mounted adjacent said lower end, and a fan mounted within said second shell adjacent said upper end, and connecting means inter-connecting said first and second heat exchange means, enabling passage of aqueous fluid from said first heat exchange means to said second heat exchange means and for recycling of aqueous fluid cooled in the second means to the first means for further heat exchange with hot gases, said connecting means including an expansion tank and a pump.

According to a further aspect of the present invention there is provided apparatus for cooling hot waste gases from steel making equipment, substantially without recovery of waste heat, comprising first heat exchange means for exchanging heat between hot gases and a cooler aqueous fluid, said first means comprising a vertical shell of circular cross-section and a plurality of tubes mounted in the shell around an inner peripheral wall thereof, second heat exchange means for condensing steam formed in the first heat exchange means, phase separation means between said first and second heat exchange means, said separation means comprising an expansion tank, pipe means interconnecting said first heat exchange means and said tank and said tank and the second heat exchange means for passage of aqueous fluid therebetween, said second heat exchange means comprising a second shell having an open lower and an open upper end, a plurality of inclined tubes inclined to the horizontal and mounted adjacent said lower end, and a fan mounted within said second shell adjacent said upper end, header means adjacent a higher end of said inclined tubes for receiving steam from said expansion tank, pipe means connecting the upper portion of the expansion tank to the header means adjacent said higher end of the tubes, pipe means interconnecting the lower portion of the tank and the lower end of the inclined tubes to enable passage of condensed steam therebetween, and control valve means in said latter pipe means for controlling outflow of condensed steam from said inclined tubes, said control valve means being responsive to pressure drop between steam in the expansion tank and steam in the header means.

In order that the invention may be clearly understood, two embodiments thereof will now be described by way of example and not of limitation, with reference to the drawings accompanying the provisional specification, in which.

Figures 1, 2:
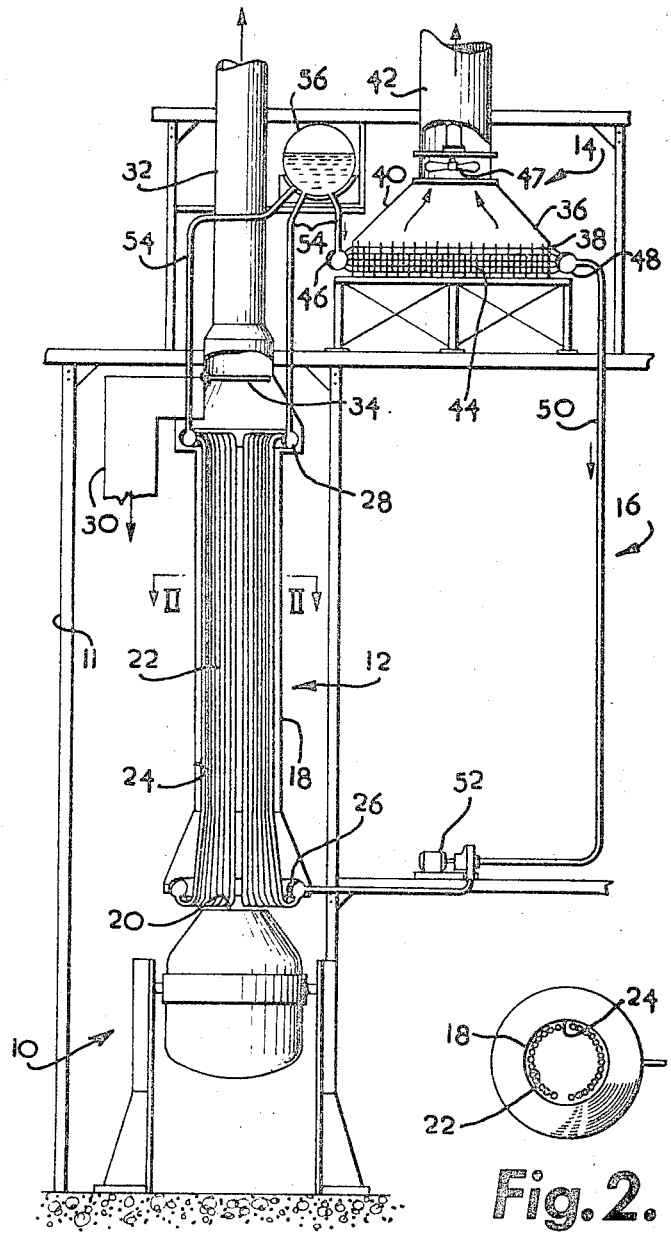
FIGURE 1 shows a view of a first steel making plant embodying the invention.
FIGURE 2 shows a section on the line II—II of FIGURE 1.

The first plant (FIGURES 1 and 2) comprises an oxygen blown steel making converter 10 in the operation of which oxygen is blown through pig iron to produce steel, and apparatus adapted for use in cooling hot waste gases from the converter 10, without recovery of waste heat. The apparatus comprises a framework 11, in which are supported a first heat exchange device 12 arranged for heat exchange between hot gases from the converter 10 and cooler water, a second heat exchange device 14 located above the device 12 and arranged for cooling of water from the device 12, and pipework 16 interconnecting the devices 12, 14; in the operation of the apparatus a high pressure closed water circuit is provided and water cooled in the device 14 is recycled along the pipework 16 to the device 12 for further heat exchange with hot gases.

The heat exchange device 12 comprises a vertical shell 18 of circular cross-section which extends upwardly from a level adjacent to and just above a mouth 20 of the converter 10, and is open at its lower end. A plurality of tubes 22 are mounted in the shell 18 around an inner peripheral wall 24 thereof. Lower end portions of the tubes 22 lead into a header 26, and upper end portions thereof lead into a header 28. In the operation of the apparatus cooled water from the device 14 flows upwardly through the tubes 22 for heat exchange with waste gases which pass from the mouth 20 upwardly through the shell 18; the gases leaving the mouth 20 contain carbon monoxide and this is burned in the shell 18, air for the combustion entering at the lower end of the shell 18; the maximum temperature of the gases after burning is, for example, about 3000° F. From the shell 18 the cooled gases pass into a conduit 30 which leads to a spray cooler for further cooling of the gases and then to an electroprecipitator (not shown) which is arranged to remove dust and the like from the gases before discharge to the atmosphere; the temperature of the gases entering the conduit 30 is, for example, between 300° F. and 400° F. In an emergency the gases may pass directly to the atmosphere through a second conduit 32, entry into which is controlled by a flap valve 34.

The heat exchange device 14 comprises a further shell 36 which comprises a squat lower portion 38, an upwardly converging central portion 40 and a narrow elongated upper portion 42; the shell 36 is open at its lower end and at its upper end. A plurality of horizontal tubes 44 are mounted in the portion 38 and a fan 47 is mounted in the portion 42. Left hand (FIGURE 1) end portions of the tubes 44 lead into a header 46 and right hand end portions of the tubes 44 lead into a header 48. In the operation of the apparatus water from the device 16 flows along the tubes 44 from the header 46 to the header 48 and is cooled by a draught of air induced by the fan 47.

The pipework 16 comprises a pipe 50 which leads from the header tube 48 to the header tube 26 via a pump 52, and pipes 54 which lead from the header 28 to the header 46 via an expansion tank 56. In cases where the natural circulation of the water is adequate it may be possible to dispense with the pump 52.

Figure 3:
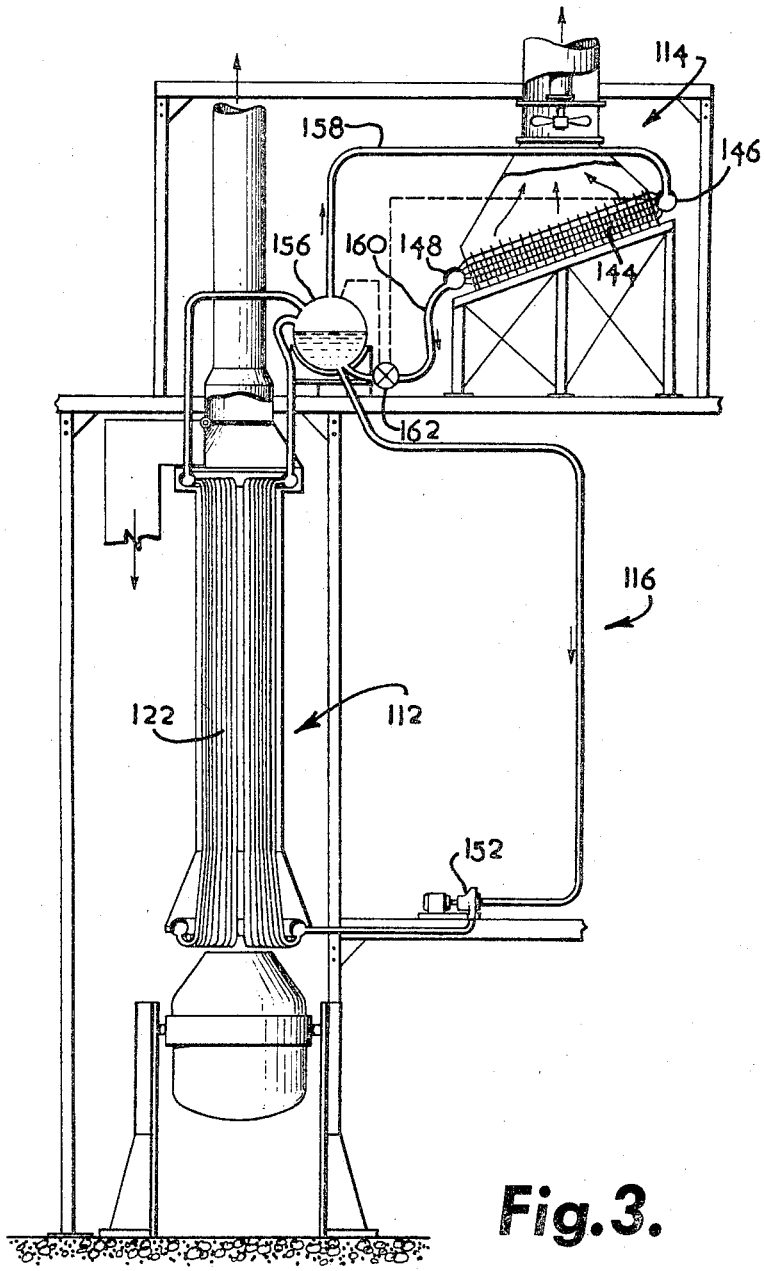
FIGURE 3 shows a view of a second steel making plant embodying the invention.

The second plant (FIGURE 3) corresponds in many respects to the first plant in construction, arrangement and mode of operation and is described in so far as it differs therefrom.

The second plant comprises gas cooling apparatus corresponding to that of the first plant. The cooling apparatus of the second plant comprises a heat exchange device 112, a heat exchange device 114, pipework 116, a pump 152, and an expansion tank 156, corresponding respectively to the device 12, the device 14, the pipework 16, the pump 52 and the tank 56. The device 112 comprises tubes 122 corresponding to the tubes 22, but in the operation of the second apparatus steam is generated in the tubes 122 and a steam/water mixture passes from the tubes 122 to the tank 156 where separation of steam and water takes place. The tank 156 thus acts in this case as a phase separation means. From the tank 156 saturated steam passes to the heat exchange device 114 where it is condensed and returned to the tank 156.

The heat exchange device 114 corresponds to the device 14 in many respects and is described in so far as it differs therefrom. The device 114 comprises a plurality of tubes 144 corresponding to the tubes 44 and extending between headers 146, 148, which correspond to the headers 46, 48; the tank 156 is located below the header 148, and the tubes 144 slope downwardly to the left (FIGURE 3) from the header 146 to the header 148 towards the tank 156.

In the operation of the apparatus the saturated steam enters the header tube 146 and water condenses in the tubes 144 and flows by gravity from the header 148 into the tank 156 below the water level thereof.

The pipework 116 comprises a pipe 158 leading from the top of the tank 156 to the header 146 and a pipe 160 leading via a control valve 162 from the header 148 to the tank 156.

The control valve 162 is arranged to control the steam pressure; opening of the valve 162 is controlled by the pressure drop between the steam in the tank 156 and in the header 146; for example, if the pressure drop increases above a required value the valve 162 opens allowing a greater flow rate of fluid through the tubes 144; this increases the cooling effect of the device 114 and causes the pressure drop to return to the required value.

It will be realised that, again, it may be possible to dispense with the pump 152.

We claim:
1. Apparatus for cooling hot waste gases from steelmaking equipment, substantially without recovery of waste heat, comprising first heat exchange means for exchanging heat between hot gases and a cooler aqueous fluid, said first means comprising a generally vertical shell and a plurality of tubes mounted in the shell around an inner peripheral wall thereof, second heat exchange means for condensing steam formed in the first heat exchange means, phase separation means between said first and second heat exchange means, said separation means comprising an expansion tank, pipe means interconnecting said first heat exchange means and said tank and said tank and the second heat exchange means for passage of aqueous fluid therebetween, said second heat exchange means comprising a second shell having an open lower and an open upper end, a plurality of inclined tubes inclined to the horizontal and mounted adjacent said lower end, and a fan mounted within said second shell adjacent said upper end, header means adjacent a higher end of said inclined tubes for receiving steam from said expansion tank, pipe means connecting the upper portion of the expansion tank to the header means adjacent said higher end of the tubes, pipe means interconnecting the lower portion of the tank and lower end of the inclined tubes to enable passage of condensed steam therebetween, and control valve means in said latter pipe means for controlling outflow of condensed steam from said inclined tubes, said control valve means being responsive to pressure drop between steam in the expansion tank and steam in the header means.

2. Apparatus as claimed in claim 1 in which there is provided an exit conduit on the vertical shell of the first heat exchange means to receive the cooled gases therefrom.

References Cited

UNITED STATES PATENTS

| 3,168,073 | 2/1965 | Durham et al. | 122—7 |
| 3,202,134 | 8/1965 | Marcheix | 122—7 X |
| 3,217,695 | 11/1965 | Durham | 122—7 |

FOREIGN PATENTS 890,869  3/1962  Great Britain.

ROBERT A. O'LEARY, *Primary Examiner.*

A. W. DAVIS, *Assistant Examiner.*

U.S. Cl. X.R.

122—7; 165—107